(12) United States Patent
Ishii et al.

(10) Patent No.: US 8,611,542 B1
(45) Date of Patent: Dec. 17, 2013

(54) PEER TO PEER KEY SYNCHRONIZATION

(75) Inventors: Hiroshi Ishii, Sunnyvale, CA (US);
Hristo Bojinov, Sunnyvale, CA (US);
Ananthan Subramanian, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 1030 days.

(21) Appl. No.: 11/740,490

(22) Filed: Apr. 26, 2007

(51) Int. Cl.
*H04L 29/06* (2006.01)
*H04L 9/14* (2006.01)

(52) U.S. Cl.
USPC .......................................... 380/277; 713/155

(58) Field of Classification Search
USPC ....................................................... 380/277
See application file for complete search history.

(56) References Cited

U.S. PATENT DOCUMENTS

| | | | |
|---|---|---|---|
| 1,310,719 A | 7/1919 | Vernam | |
| 4,262,329 A | 4/1981 | Bright et al. | |
| 4,558,176 A | 12/1985 | Arnold et al. | |
| 4,588,991 A | 5/1986 | Atalla | |
| 4,757,533 A | 7/1988 | Allen et al. | |
| 5,065,429 A | 11/1991 | Lang | |
| 5,150,407 A | 9/1992 | Chan | |
| 5,185,717 A | 2/1993 | Mori | |
| 5,235,641 A | 8/1993 | Nozawa | |
| 5,235,642 A | 8/1993 | Wobber et al. | |
| 5,265,159 A | 11/1993 | Kung | |
| 5,265,164 A | 11/1993 | Matyas et al. | |
| 5,610,595 A * | 3/1997 | Garrabrant et al. | 340/825.52 |
| 5,677,952 A | 10/1997 | Blakley, III et al. | |
| 5,687,237 A | 11/1997 | Naclerio | |
| 5,713,017 A * | 1/1998 | Lin et al. | 1/1 |
| 5,720,034 A | 2/1998 | Case | |
| 5,850,448 A | 12/1998 | Ganesan | |
| 5,870,468 A | 2/1999 | Harrison | |
| 5,931,947 A | 8/1999 | Burns | |
| 5,933,498 A | 8/1999 | Schneck et al. | |
| 5,940,507 A | 8/1999 | Cane | |

(Continued)

FOREIGN PATENT DOCUMENTS

| | | |
|---|---|---|
| WO | WO 02/093314 A2 | 11/2002 |
| WO | WO 02/093314 A3 | 11/2002 |

OTHER PUBLICATIONS

Menezes et al., "Handbook of Applied Cryptography," CRC Press, pp. 1-794, 1997.

(Continued)

*Primary Examiner* — Gilberto Barron, Jr.
*Assistant Examiner* — Brian Olion
(74) *Attorney, Agent, or Firm* — Cesari and McKenna, LLP

(57) ABSTRACT

Apparatus and method for synchronizing objects, e, g., encryption key objects, between pairs of appliances, particularly lifetime key management (LKM) appliances. Each LKM has a local sequence counter where increasing sequence numbers are generated and applied to objects. A peer counter is used to indicate the sequence number of an object synchronized from a peer appliance. When two appliances are synchronized, only those new objects with sequence numbers at least equal to or higher than that within the other appliance are transferred. When synchronized to each other, each appliance will have an up-to-date stored set of objects for all of the appliances in the group. Each object has a unique identification number that are compared to eliminate duplicate objects. During synchronization, if unique identification numbers match between a newly received object and a previously stored key, version numbers may be used to determine which object the receiving appliance should store.

19 Claims, 6 Drawing Sheets

(56) References Cited

U.S. PATENT DOCUMENTS

| | | | |
|---|---|---|---|
| 5,991,406 A | 11/1999 | Lipner et al. | |
| 6,073,237 A | 6/2000 | Ellison | |
| 6,119,098 A * | 9/2000 | Guyot et al. | 705/14.61 |
| 6,134,660 A | 10/2000 | Boneh et al. | |
| 6,175,924 B1 | 1/2001 | Arnold | |
| 6,185,681 B1 | 2/2001 | Zizzi | |
| 6,185,684 B1 | 2/2001 | Pravetz et al. | |
| 6,212,280 B1 * | 4/2001 | Howard et al. | 380/279 |
| 6,212,600 B1 | 4/2001 | Friedman et al. | |
| 6,247,135 B1 * | 6/2001 | Feague | 713/400 |
| 6,249,866 B1 | 6/2001 | Brundrett | |
| 6,272,632 B1 | 8/2001 | Carman et al. | |
| 6,292,835 B1 * | 9/2001 | Huang et al. | 709/235 |
| 6,345,101 B1 | 2/2002 | Shukla | |
| 6,356,941 B1 | 3/2002 | Cohen | |
| 6,405,315 B1 | 6/2002 | Burns et al. | |
| 6,414,884 B1 | 7/2002 | DeFelice et al. | |
| 6,507,911 B1 | 1/2003 | Langford | |
| 6,550,011 B1 | 4/2003 | Sims, III | |
| 6,625,734 B1 | 9/2003 | Marvit et al. | |
| 6,684,222 B1 | 1/2004 | Cornelius et al. | |
| 6,735,693 B1 | 5/2004 | Hamlin | |
| 6,754,827 B1 | 6/2004 | Cane et al. | |
| 6,782,476 B1 * | 8/2004 | Ishibashi | 713/169 |
| 6,792,544 B2 | 9/2004 | Hashem | |
| 6,839,437 B1 | 1/2005 | Crane et al. | |
| 6,851,056 B2 | 2/2005 | Evans | |
| 6,857,076 B1 | 2/2005 | Klein | |
| 6,868,406 B1 | 3/2005 | Ogg et al. | |
| 6,915,435 B1 | 7/2005 | Merriam | |
| 6,931,133 B2 | 8/2005 | Andrews et al. | |
| 6,993,661 B1 | 1/2006 | Garfinkel | |
| 7,003,674 B1 | 2/2006 | Hamlin | |
| 7,020,779 B1 | 3/2006 | Sutherland | |
| 7,093,127 B2 | 8/2006 | McNulty et al. | |
| 7,096,355 B1 | 8/2006 | Marvit et al. | |
| 7,120,696 B1 | 10/2006 | Au et al. | |
| 7,136,995 B1 | 11/2006 | Wann | |
| 7,139,917 B2 | 11/2006 | Jablon | |
| 7,146,505 B1 | 12/2006 | Harada et al. | |
| 7,188,253 B2 | 3/2007 | Halasz et al. | |
| 7,215,771 B1 | 5/2007 | Hamlin | |
| 7,222,228 B1 | 5/2007 | Stephens et al. | |
| 7,240,197 B1 | 7/2007 | Yamagami et al. | |
| 7,260,724 B1 | 8/2007 | Dickinson et al. | |
| 7,340,500 B2 | 3/2008 | Traversat et al. | |
| 7,346,160 B2 | 3/2008 | Michaelsen | |
| 7,383,436 B2 | 6/2008 | Srivastava et al. | |
| 2001/0054155 A1 | 12/2001 | Hagan et al. | |
| 2002/0046286 A1 | 4/2002 | Caldwell et al. | |
| 2002/0073324 A1 | 6/2002 | Hsu | |
| 2002/0110244 A1 * | 8/2002 | Flanagan et al. | 380/277 |
| 2002/0114453 A1 | 8/2002 | Bartholet et al. | |
| 2003/0005342 A1 * | 1/2003 | Thomas et al. | 713/400 |
| 2003/0021417 A1 | 1/2003 | Vasic et al. | |
| 2003/0028765 A1 | 2/2003 | Cromer et al. | |
| 2003/0037247 A1 * | 2/2003 | Obara et al. | 713/193 |
| 2003/0088866 A1 * | 5/2003 | Boldon et al. | 717/170 |
| 2004/0030668 A1 | 2/2004 | Pawlowski et al. | |
| 2004/0107342 A1 | 6/2004 | Pham et al. | |
| 2004/0127242 A1 * | 7/2004 | Dashevsky et al. | 455/502 |
| 2005/0018853 A1 * | 1/2005 | Lain et al. | 380/277 |
| 2007/0058801 A1 | 3/2007 | Plotkin | |
| 2007/0086335 A1 * | 4/2007 | McCanne et al. | 370/229 |
| 2007/0174634 A1 | 7/2007 | Plotkin | |
| 2008/0101610 A1 * | 5/2008 | Birk et al. | 380/277 |
| 2008/0152150 A1 * | 6/2008 | Higashi et al. | 380/282 |
| 2008/0301791 A1 | 12/2008 | Smith et al. | |
| 2009/0089450 A1 | 4/2009 | Weatherford et al. | |
| 2009/0089867 A1 | 4/2009 | Weatherford et al. | |

OTHER PUBLICATIONS

Anderson, et al., "The Steganographic File System," Information Hiding, Second International Workshop, IH '98 Portland, Oregon. USA, Apr. 14-17, 1998, Proceedings, pp. 73-82, 1998.

Antonelli, et al., "The Packet Vault: Secure Storage of Network Data," CITI Technical Report 98-5, pp. 1-15, Jun. 25, 1998.

Baldwin, et al., "Encryption and Key Management in a SAN," Hewlett Packard Laboratories, Bristol, UK, 10 pages, 2002.

Blaze, "Oblivious Key Escrow," Information Hiding, First International Workshop, Cambridge, UK, May 3D-Jun. 1, 1996, Proceedings, pp. 335-343, 1996.

Blaze, "A cryptographic File System for Unix," Proceedings of the First ACM Conference on Computer and Communications Security, pp. 9-16 (1993).

Blaze, "Key Management in an Encrypting File System," USENIX Summer 1994 Technical Conference, pp. 27-35, (Jun. 6-10, 1994).

Bojinov, et al., Apparatus for Lifetime Key Management, U.S. Appl. No. 11/740,474, filed Apr. 26, 2007, 26 pages.

Bojinov, et al., Encryption Keys for Data Recovery in Storage Security Appliances, U.S. Appl. No. 11/532,025, filed Sep. 14, 2006, 16 pages.

Boneh, et al., "A Revocable Backup System," In Proceedings 6th USENIX Security Conference, pp. 91-96, 1996.

Cattaneo, et al. "The Design and Implementation of a Transparent Cryptographic Filesystem for UNIX," Proceedings of The FREENIX Track: 2001 UNIX Annual Technical Conference. pp. 199-212 (Jun. 25-30, 2001).

Christy, et al., "Mechanism for Secure Off-Site Computer Access," IBM Technical Disclosure Bulletin. pp. 6754-6756. Apr. 1985.

Clark, "Physical Protection of Cryptographic Devices," Lecture Notes in Computer Science. Advances in Cryptology—EUROCRYPT '87, pp. 83-93 (Apr. 13-15, 1987).

Coleman et al., "Mass Storage System Reference Manual: Version 4," Technical Committee on Mass Storage Systems and Technology, IEEE, pp. 1-38, May 1990.

Comba, "Approaches to Cryptographic Key Management," Symposium on Applied Computing. Proceedings of the Northeast ACM Symposium on Personal Computer Security, pp. 38-45 (1986).

Denning, "Cryptography and Data Security," Addison-Wesley Publishing Co., pp. 164-169 and 179, 1982.

Di Crescenzo, et al., "How to Forget a Secret (Extended Abstract)," 16th Annual Symposium on Theoretical Aspects of Computer Science, pp. 500-509 (Mar. 4-6, 1999).

Dietrich, "Security Enclosure With Elastomeric Contact Stripes, " IBM Technical Disclosure Bulletin, pp. 444-445, Feb. 1991.

"Disappearing Inc. Makes Old Email Vanish Everywhere; Reduces Corporate Liability as well as Improves Corporate Productivity by Enabling Sensitive Communications via Email-Company Business and Marketing," Edge: Work-Group Computing Report, http://findarticles.com/p/articJes/mLmOWUB/is_1999_0cU 1/aL 56260487/print (Oct. 11, 1999).

Double, "Encryption Key Security by Electric Field Destruction of Memory Cells," IBM Technical Disclosure Bulletin, pp. 8-11, Jan. 1989.

FIPS PUB 74, "Federal Information Processing Standards Publication 1981 Guidelines for Implementing and Using the NBS Data Encryption Standard," Federal Information Processing Standards Publication 74, National Institute of Standards and Technology, Apr. 1, 1981, 39 pages.

FIPS PUB 140-1, "Security Requirements for Cryptographic Modules," Federal Information Processing Standards Publication 140-1, National Institute of Standards and Technology, Jan. 11, 1994, 44 pages.

Flavin, et al., "Data Protection on Magnetic Media Via an Encrypting Controller," IBM Technical Disclosure Bulletin, vol. 3D, No. 3, pp. 1284-1285 (Aug. 1987).

Gandhasri, R., Host Based Rekeying, U.S. Appl. No. 11/772,447, filed Sep. 4, 2007, 25 pages.

Garfinkel, S., "PGP: Pretty Good Privacy," O'Reilly & Associates, pp. 43 and 65-67, Jan. 1995.

(56) References Cited

OTHER PUBLICATIONS

Garfinkel, S., "PGP: Pretty Good Privacy," O'Reilly & Associates, pp. 54-55, 151-153, Jan. 1995.
Garfinkel, S., "Omniva's Self-Destructing Email," Web Security, Privacy and Commerce, Second Edition, O'Reilly & Associates, Inc., Sebastopol, CA, pp. 280-283, Jan. 2002.
Gobioff, Howard, et al., "Security for Networked Attached Storage Devices," Carnegie Mellon University Computer Science Technical Report CMU-CS-97-185, Oct. 1997, 20 pages.
Gobioff, Howard, "Security for a High Performance Commodity Storage Subsystem," Carnegie Mellon University Computer Science Technical Report CMU-CS-99-160, Jul. 1999, 222 pages.
Gobioff, Howard, et al., "Smart Cards in Hostile Environments," Proceedings of the Second USENIX Workshop on Electronic Commerce, pp. 23-28 (Nov. 18-21, 1996).
Graham, et al, "Data Protection at the Volume Level," IBM Technical Disclosure Bulletin, pp. 146-148, Oct. 1988.
Gutmann, "Secure Deletion of Data from Magnetic and Solid-State Memory," Proceedings of the Sixth Annual USENIX Security Symposium: Focusing on Applications of Cryptography, pp. 7-89 (Jul. 22-25, 1996).
Hwang, et al., "An Access Control Scheme Based on Chinese Remainder Theorem and Time Stamp Concept," Computers & Security, vol. 15. No. 1. pp. 73-81,1996.
IBM Crypto Server Management General Information Manual, First Edition (May 2000), 16 pages.
IBM SecureWay Cryptographic Products IBM 4758 PCI Cryptographic Coprocessor Installation Manual, Security Solutions and Technology Department, Second Edition (Mar. 2000), 34 pages.
IBM Integrated Cryptographic Coprocessors for IBM eServer zSeries 900 and for IBM S/390 Servers (Data sheet), 2000, 4 pages.
IBM SecureWay, UltraCypher Cryptographic Engine (Datasheet) (1998), 2 pages.
IBM 4758 PCI Cryptographic Coprocessor Custom Software Installation Manual, Second Edition, Jan. 2001, 30 pages.
Ishii, H., et al., Cluster Key Synchronization, U.S. Appl. No. 11/741,495, filed Apr. 27, 2007, 33 pages.
Avoid Litigation: Encrypt Your Data, InfoTech Research Group, Sep. 19, 2006, 6 pages.
Johnson et al., "Self-Destructing Diskette," IBM Technical Disclosure Bulletin, vol. 33, No. 1A, pp. 218-219 (Jun. 1990).
Mallett, "Considerations for Applying Disk Encryptors 10 Environments Subject to Hostile Overrun," IEEE, pp. 218-222, 1991.
Mauriello, "TCFS: Transparent Cryptographic File system," LINUX Journal, Aug. 1, 1997, 8 pages.
Moore, "Preventing Access to a Personal Computer," IBM Technical Disclosure Bulletin, pp. 98-100, Sep. 1992.
Omniva Policy Systems, www.omniva.com, (Aug. 2004), downloaded from web.archive.org on Aug. 24, 2004, 19 pages.
Provos, Niels, "Encrypting Virtual Memory," CITI Technical Report 00-3, Center for Information Technology Integration, University of Michigan, Apr. 25, 2000, 11 pages.
Scherzer. "Memory Protection in Chip Cards," IBM Technical Disclosure Bulletin, pp. 416-417, Oct. 1989.
Schneier, "Applied Cryptography Second Edition: Protocols, Algorithms, and Source Code in C," John Wiley & Sons, Inc. pp. 5, 15, 179-181, 185, 213-214, 225, 229, 563-566 and 569. 1996.
Slusarczuk et al., "Emergency Destruction of Information Storage Media," Institute for Defense Analysis, IDA Report R-321, Dec. 1987, 196 pages.
Smith, "Verifying Type and Configuration of an IBM 4758 Device: A While Paper," IBM T.J. Watson Research Center pp. 1-7 (218/00).
Smith et al., "IBM Research Report: Building a High-Performance, Programmable Secure Coprocessor," IBM Research Division, Computer Science/Mathematics, RC 21102(94393) (Feb. 19, 1998), 61 pages.
Stinson, Douglas R., "Cryptography: Theory and Practice," CRC Press, Mar. 1, 1995, 228 pages.
Subramanian, A., et al., System and Method for Initial Key Establishment Using a Split Knowledge Protocol, U.S. Appl. No. 11/540,440, filed Sep. 29, 2007, 27 pages.
Vernam, "Cipher Printing Telegraph Systems for Secret Wire and Radio Telegraphic Communications," Journal of the AIEE. pp. 109-115, Feb. 1926.
Weingart, "Physical Security for the uABYSS System," Proceedings 1987 IEEE Symposium on Security and Privacy, pp. 2-58 (Apr. 27-29, 1987), pp. 52-58.
Whitten et al., "Usability of Security: A Case Study," CMU Computer Science Technical Report CMU-CS-98-155. pp. 139, Dec. 18, 1998.
Yee et al., "Secure Coprocessors in Electronic Commerce Applications," Proceedings of the First USENIX Workshop of Electronic Commerce, pp. 155-170, Jul. 11-12, 1995.
Yeh et al., "S/390 CMOS Cryptographic Coprocessor Architecture: Overview and Design Considerations," IBM J. Res. Develop., vol. 43, No. 5/6, pp. 777-794 (Sep./Nov. 1999).
Zadok et al., "Cryptfs: A Stackable Vnode Level Encryption File System," Computer Science Department, Columbia University, CUCS-021-98, pp. 1-14, Jun. 1998.
Itoi, "SC-CFS: Smartcard Secured Cryptographic File System," CITI Technical Report 01-6, Center for Information Technology Integration, University of Michigan, Jan. 16, 2001, 11 pages.

* cited by examiner

PEER TO PEER KEY SYNCHRONIZATION

CROSS REFERENCE TO RELATED APPLICATIONS

The present application is related to commonly owned and concurrently filed U.S. patent application Ser. No. 11/740,474, entitled, "Apparatus for Lifetime Key Management," filed Apr. 26, 2007; and which is hereby incorporated herein by reference.

BACKGROUND OF THE INVENTION

1. Field of the Invention

The present invention relates to secure systems, and more specifically to secure systems having encryption key servers, where encryption keys are distributed and synchronized between pairs of processing entities in the system.

2. Background

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of data containers, such as files on, e.g., the disks. Each "on-disk" file may be implemented as a set of data structures, e.g., disk blocks, configured to store information, such as the actual data (i.e., file data) for the file.

The file server, or filer, may be further configured to operate according to a client/server model of information delivery to thereby allow many client systems (clients) to access shared resources, such as files, stored on the filer. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the filer. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS) and the Network File System (NFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored data using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC (e.g., FCP) or TCP (iSCSI).

SCSI is a peripheral input/output (I/O) interface with a standard, device independent protocol that allows different peripheral devices, such as disks, to attach to a storage system. In SCSI terminology, clients operating in a SAN environment are "initiators" that initiate commands and requests to access data. The storage system is thus a "target" configured to respond to the data access requests issued by the initiators in accordance with a request/response protocol. The initiators and targets have endpoint addresses that, in accordance with the FC protocol, comprise worldwide names (WWN). As known to those skilled in the art, a WWN is a unique identifier, e.g., a node name or a port name, that may consist of an 8-byte or larger number.

A network environment may be provided wherein information (data) is stored in secure storage served by one or more storage systems coupled to one or more security appliances. Each security appliance is configured to transform unencrypted data (cleartext) generated by clients (or initiators) into encrypted data (ciphertext) destined for secure storage or "cryptainers" on the storage system (or target). As used herein, a cryptainer is a piece of storage on a storage device, such as a disk, in which the encrypted data is stored. In the context of a SAN environment, a cryptainer can be, e.g., a disk, a region on the disk or several regions on one or more disks that, in the context of a SAN protocol, is accessible as a logical unit number (lun). In the context of a NAS environment, the cryptainer may be a collection of files on one or more disks. Specifically, in the context of the CIFS protocol, the cryptainer may be a share, while in the context of the NFS protocol, the cryptainer may be a mount point. In a tape environment, the cryptainer may be a tape containing a plurality of tape blocks.

Each cryptainer is associated with its own encryption key, e.g., a cryptainer key, which is used by the security appliance to encrypt and decrypt the data stored on the cryptainer. An encryption key is a code or number which, when taken together with an encryption algorithm, defines a unique transformation used to encrypt or decrypt data. Data remains encrypted while stored in a cryptainer until requested by an authorized client. At that time, the security appliance retrieves the encrypted data from the cryptainer, decrypts it and forwards the unencrypted data to the client.

In many practical security systems there are many cryptainers that have to be managed by a single or by multiple security appliances. In the case of multiple security appliances, this management involves maintaining up-to-date (i.e. synchronizing) encryption keys on each of the security appliances. A resource to help manage these encryption keys (key and encryption key are used interchangeably herein) includes an LKM appliance (lifetime key management). However, some security systems employ multiple LKM appliances that are synchronized. As a result, an administrator may simply not be able to coordinate the synchronizations among the security appliances and the thousands of cryptainers together with the LKMs. That is, manual synchronization between for example, any pair of LKMs or an LKM and a security appliance, where there may be thousands of such pairs is difficult and time consuming.

SUMMARY OF THE INVENTION

The limitations described above are addressed by a system and protocol for synchronizing objects, preferably encryption key objects, between two appliances, by assigning sequence numbers to the objects and maintaining a count of the objects synchronized, where any difference in the relative counts refers to objects that are to be transferred during synchronization. When two appliances are synchronized, only those new objects with sequence numbers at least equal to or higher than that within the other appliance are transferred. Advantageously, not all objects need to be transferred. Herein and as used below, when an appliance, such as an LKM (lifetime key manager) or a security appliance communicate with another, the latter appliance is herein defined as a "peer." The LKMs and/or security appliances illustratively communicate over a link and thus embody the only "nodes," described herein.

The present invention is described below with respect to encryption keys in secure storage systems, but, as would be known to those skilled in the art, wherever objects are distributed among a group of peer systems, the present invention may be advantageously applied. The scope of the invention is not to be restricted to secure storage systems alone. For example, a table in a data base, a file in a filer, or an entry in a listing, and other object types known to those skilled in the art may benefit using the present invention. As used herein, the term "key object" may include the key itself and other fields, e.g., a sequence number, a version number, a universally unique identification number, and other fields as may be applicable in other environments. Generally, as used herein the term, "key" refers to the actual encryption key, while "key object" refers to the key and other fields, that may accompany the key when it is stored, e.g., in memory. However, "key" and "key object" are used interchangeably in context as would be understood by those skilled in the art If a new key is created or an existing key is modified by a security appliance, the new/modified keys are sent to the LKM. The content of a sequence counter (i.e., a sequence number) in the LKM is associated with that key, and the sequence counter is incremented, illustratively increasing monotonically, in anticipation of the next synchronization. The sequence counter and the number associated with the new or modified key is always higher than that of any other key in the LKM. The LKM stores the key and the sequence number (a key object) in its data store, as described herein. That is, as keys are created/modified and delivered to an LKM, the monotonically increasing sequence numbers are associated and stored with the keys. Illustratively, a security appliance is not synchronized with the LKM, but when a client requests information from a security appliance that does not have the encryption key, the security appliance requests and receives the key from an LKM.

As implemented herein, a version number may be associated with each key. When a modified key is received by an LKM, that has already stored an earlier version of the key (as a key object), the version number is incremented and the received modified key object replaces the previously stored key object.

In a system where two LKMs are synchronized with each other, each LKM contains at least two counters, one is a sequence counter and the other is a "peer" counter. The peer counter tracks objects that have been sent by the other LKM during a previous synchronization. That is, the sequence numbers for keys assigned in each LKM are distinguished from each other, and the peer counter provides this capability. A secure connection is established between the LKMs, whereupon the first LKM sends to the second LKM the highest peer counter number, say X1, stored in the first LKM. The second LKM responds by sending to the first LKM an object stored in the second LKM with a sequence number, say N2, that is higher than X1. If no object with a higher sequence number exists, a negative response is returned to the first LKM.

The same operation takes place where the second LKM sends to the first LKM the highest peer counter number, say X2, stored in the second LKM. The first LKM responds by sending to the second LKM an object stored in the second LKM with a sequence number, say N1, that is higher than X2. These operations are arranged to occur at regular intervals, or may be triggered by an LKM storing a new or modified key.

The peer counters represent the state of synchronization between two peer appliances, for example two LKM appliances, and when the peer counters in each appliance hold the same value as the sequence counters in each appliance, the two appliances are synchronized with up-to-date key objects.

It will be appreciated by those skilled in the art that although the following Detailed Description will proceed with reference being made to illustrative embodiments, the drawings, and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

The invention description below refers to the accompanying drawings, of which.

DETAILED DESCRIPTION OF AN
ILLUSTRATIVE EMBODIMENT

A. Security Appliance Environment

Figure 1:
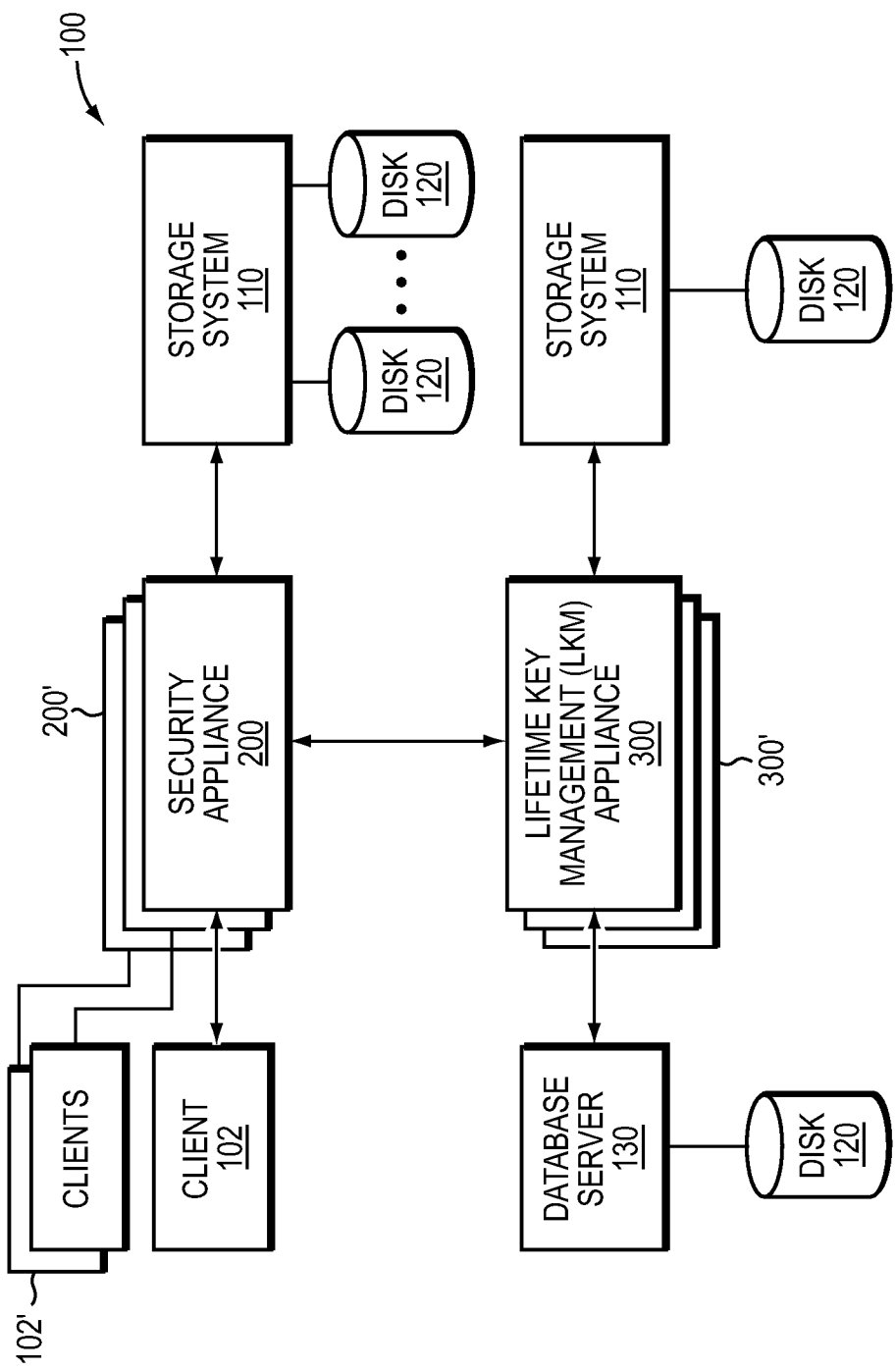
FIG. 1 is a schematic block diagram system of a multi-protocol preferred embodiment employing the present invention.

FIG. 1 is a schematic block diagram of an environment 100 including a multi-protocol security appliance 200 that may be advantageously used with the present invention. The security appliance 200 is coupled between one or more clients 102 and one or more storage systems 110. The security appliance 200, which is configured to act as an encryption proxy, intercepts a data access request issued by client 102 and destined for the storage system 110, wherein the data access request may be a read request to retrieve certain data stored on storage devices, such as disks 120, coupled to the storage system 110, or a write request to store data on the disks. In the case of a write request, the security appliance 200 intercepts the request, encrypts the data associated with the request and forwards the encrypted data to the storage system 110 for storage at a specified location (address) on disk 120. In the case of a read request, the security appliance 200 intercepts the request and forwards it onto the storage system 110, which returns the requested data to the appliance in encrypted form. The security appliance 200 then decrypts the encrypted data and returns the decrypted data to the client 102.

The storage system 110 is configured to provide storage service for both file and block protocol access to information stored on storage devices, such as disks 120. The storage system 110 is illustratively embodied as a system comprising a processor, a memory, a plurality of network adapters, and a storage adapter (these components are not shown in FIG. 1). The storage system 110 also includes a storage operating system (not shown) that includes a virtualization system including a file system to logically organize the information as a hierarchical structure of named directories, file and virtual disk (vdisk) storage objects on disks 120. The storage system 110 includes the interface to communicate with the security appliances 200, 200' and the LKM's 300, 300'

In the illustrative embodiment, the security appliance 200 employs a conventional encryption algorithm, e.g., the Advanced Encryption Standard (AES) or other appropriate algorithms, to transform unencrypted data (cleartext) generated by the clients 102 into encrypted data (ciphertext) intended for secure storage, i.e., one or more cryptainers, on the storage system 110. To that end, the security appliance illustratively uses a high-quality, software or hardware-based pseudo random number generation technique to generate encryption keys. The encryption and decryption operations are performed using these encryptions keys, such as a cryptainer key associated with each cryptainer. Illustratively, the security appliance 200 uses an appropriate cryptainer key to encrypt or decrypt portions of data stored in a particular cryptainer. In addition to performing encryption and decryption operations, the security appliance 200 also performs access control, authentication, virtualization, and secure-logging operations.

A lifetime key management (LKM) appliance 300 is configured to manage encryption keys used by the security appliance 200 to encrypt and decrypt data securely stored on the storage system 110, ensuring encryption key availability for the life of the secured data. For example, the LKM appliance 300 receives encrypted cryptainer keys from the security appliance 200 and provides encrypted cryptainer keys on demand to the security appliance 200. The LKM appliance is further configured to support a plurality of security appliances 200, 200' such that, when a particular security appliance encounters a data access request directed to a cryptainer for which it does not have the appropriate key, that appliance 200 accesses the LKM appliance 300 to receive the appropriate key.

In one embodiment, the LKM appliance 300 and the security appliance 200 are in communication with other security appliances 200' and with other LKM appliances 300.' The other security appliances 200,' in turn, connect to other clients 102.' As noted earlier, the security appliances and LKM appliances communicate over a link and, as referenced herein embody the only "nodes." Furthermore, when one node communicates with another node, say via a secure link, that latter node is a "peer." If, for example, the security appliance 200 communicates with a security appliance 200,' the security appliance 200' is a peer of the security appliance 200. Similarly, if the LKM 300 communicates with an LKM 300,' LKM 300' is a peer of LKM 300, and if an LKM 300 communicates with a security appliance 200, that security appliance 200 is a peer of the LKM 300. Note, when an LKM appliance communicates with a security appliance, the LKM is synchronized with the security appliance by way of receiving new or newly modified keys from the security appliance. Since the LKM does not create or modify keys, the security appliance is not synchronized (as the word is used herein) to the LKM. That is, the security appliance only requests and receives keys as requested by a client.

When initializing a security appliance, a system administrator via a GUI (not shown in FIG. 1) specifies the LKM appliances 300, 300' with which the appliances 200, 200' are to communicate. In addition, a "trust" relationship is established between each security appliance and LKM appliance using, e.g., a shared secret, a certificate to establish a secure communications channel, or using other mechanisms for establishing secure communication as known in the art. Once the secure channel is established, any key generated by the security appliance can be forwarded to the LKM appliance, 300, for, e.g., storage in a key object database 395, formed in the disk storage 160 for memory storage 400 (FIG. 3) Similarly, when an inquiry from a client requires a key not found in the security appliance, that security appliance will obtain the key from the LKM. Keys are created and/or modified in the various security appliances, and subsequently transferred to the LKMs. The LKMs synchronize their key objects to suitably service the security appliances.

Figure 3:
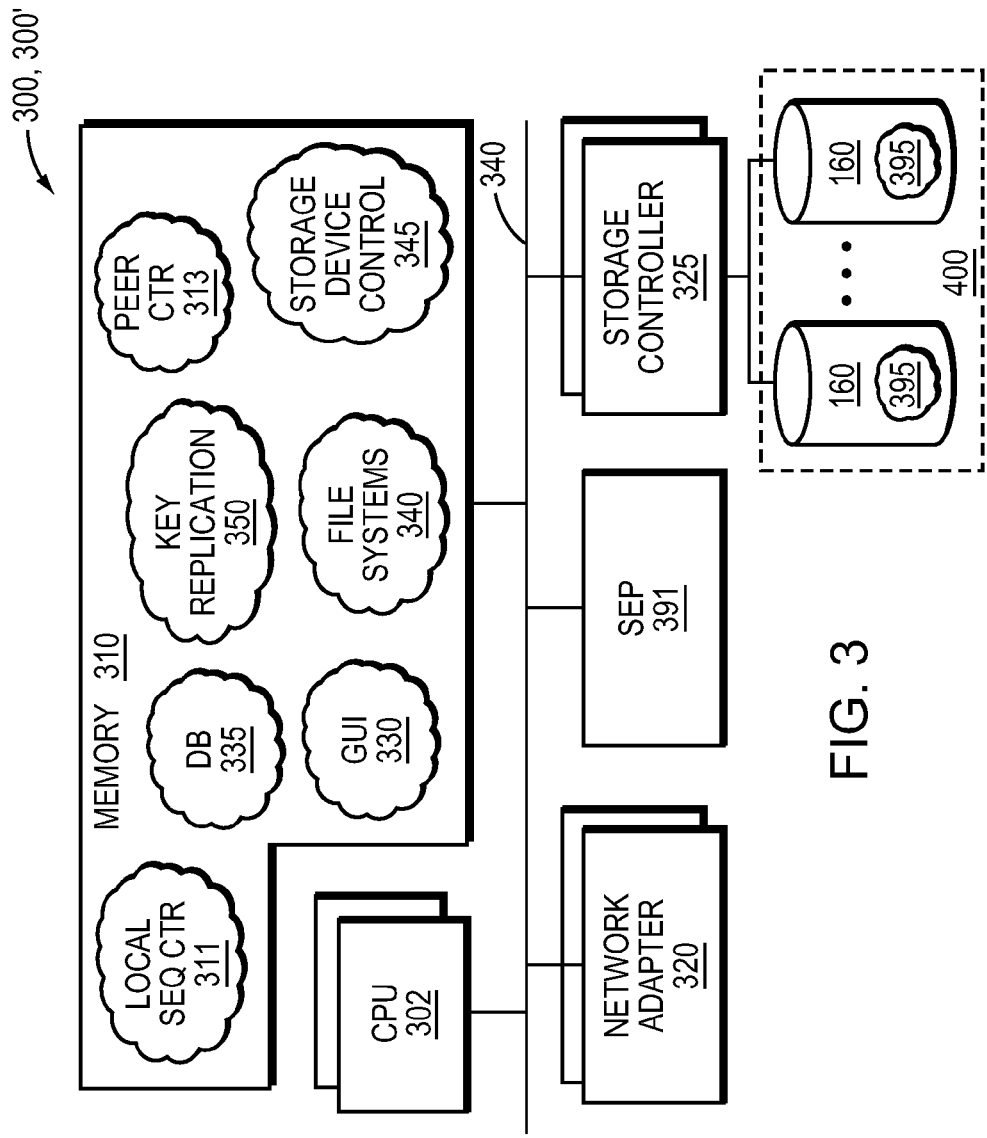
FIG. 3 is a schematic block diagram of a lifetime key management (LKM) appliance in accordance with the present invention.

Still referring to FIG. 1, the LKM appliance 300 is interconnected to a database server 130, which includes additional storage devices such as disks 120. Alternatively, a second storage system 110 may be interconnected with the LKM appliance 300. In an alternative embodiment of the present invention, the LKM appliance 300 may utilize the external database server 130 for storage of keys. Thus, in such an embodiment, the database server 130 may execute a database application (not shown) implementing, e.g., a conventional a Structured Query Language (SQL) compliant database. Illustratively, the LKM appliance 300 includes a set of internal storage 160 as shown in FIG. 3 described further below. However, in alternative embodiments, the LKM appliance 300 may utilize external storage, such as that offered by storage system 110. It should be noted that while the LKM appliance 300 is shown interconnected to a database server 130 and a storage system 110, these are shown for illustrative purposes only. As such, neither database server 130 nor storage system 110 is necessary for operation of a LKM appliance 300.

Furthermore, in embodiments where the LKM appliances 300, 300' are implemented within a single environment, each LKM appliance may utilize a different storage technique. Thus, for example a first LKM appliance 300 may utilize internal storage, a second LKM appliance 300' may utilize a database server 130 for key storage, while a third LKM appliance 300' utilizes external storage provided by storage system 110. As can be appreciated by one skilled in the art, by the use of a LKM appliance 300, administrators are provided with additional configuration capabilities to meet specific environmental and/or security concerns.

B. Security Appliance

Figure 2:
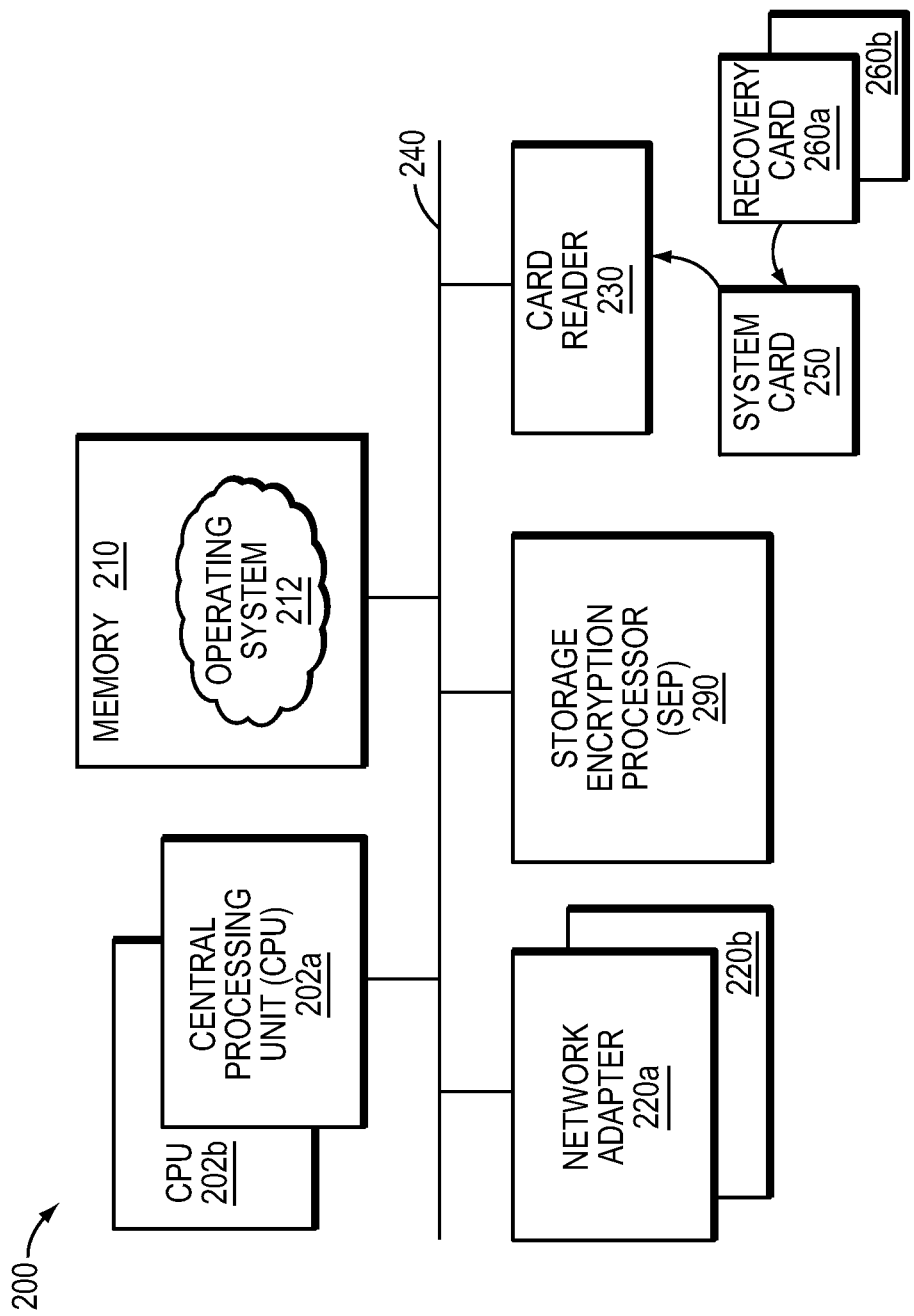
FIG. 2 is as schematic block diagram of a multi-protocol security appliance that may be advantageously used with the present invention.

FIG. 2 is a schematic block diagram of the multi-protocol security appliance 200 that may be advantageously used with the present invention. As used herein, a security appliance denotes a computer having features such as simplicity of security service management for users (system administrators) and clients of network attached storage (NAS) and storage area network (SAN) deployments. The security appliance comprises one or more processors, e.g., central processing units (CPU 202a, b), a memory 210, one or more network adapters 220a,b, a storage encryption processor (SEP) 290 and a card reader 230 interconnected by a system bus 240, such as a conventional Peripheral Component Interconnect (PCI) bus. The SEP 290 is configured to perform all encryption and decryption operations for the security appliance in a secure manner; for example, the SEP is configured to protect plaintext encryption keys from system software executing on each CPU 202. Accordingly, the SEP is illustratively embodied as a Federal Information Processing Standards (FIPS) certified module that is mounted onto a dedicated interface card or other similar card.

Since the SEP 290 protects encryption keys from being "touched" (processed) by the system software executing on the CPU 202a,b, the card reader 230 provides an interface between a "smart" system card 250 and the SEP 290 for purposes of exchanging encryption keys. Illustratively, the system card 250 is configured with customized software code to securely interface with the recovery cards 260a and 260b. The recovery cards 260a and 260b allow the system to be regenerated by manually using separate unique cards 260a, 260b used by selected personnel to recover a system that went down.

The network adapters 220 couple the security appliance 200 between one or more clients 102 and one or more storage systems 110 over point-to-point links, wide area networks, virtual private networks implemented over a public network (Internet) or shared local area networks. In a SAN environment configured to support various Small Computer Systems Interface (SCSI)-based data access protocols, including SCSI encapsulated over TCP (iSCSI) and SCSI encapsulated over FC (FCP), the network adapters 220 may comprise host bus adapters (HBAs) having the mechanical, electrical and signaling circuitry needed to connect the appliance 200 to, e.g., a FC network. In a NAS environment configured to support, e.g., the conventional Common Internet File System (CIFS) and the Network File System (NFS) data access protocols, the network adapters 220 may comprise network interface cards (NICs) having the mechanical, electrical and signaling circuitry needed to connect the appliance to, e.g., an Ethernet network.

The memory 210 illustratively comprises storage locations that are addressable by the processors and adapters for storing software programs and data structures associated with the present invention. The processor and adapters may, in turn, comprise processing elements and/or logic circuitry configured to execute the software programs and manipulate the data structures. An operating system 212, portions of which is typically resident in memory and executed by the processing elements, functionally organizes the appliance 200 by, inter alia, invoking security operations in support of software processes and/or modules implemented by the appliance. It will be apparent to those skilled in the art that other processing and memory means, including various computer readable media, may be used for storing and executing program instructions pertaining to the invention described herein. Those skilled in the art would understand that in other embodiments security appliance 200 can be integrated within the storage system 110.

C. LKM Appliance

FIG. 3 is a schematic block diagram of an LKM (lifetime key management) 300, 300' in accordance with the present invention. Illustratively, a hardened hardware platform is utilized as the LKM appliance that includes a SEP for management of keys among a group of security appliances. Specifically, the LKM appliance implements secure storage for cryptainers' encryption keys that are adapted for use with the security appliances. To that end, the LKM appliance implements the key object database 395 formed on the disks 160 within the memory 400 Alternatively, the keys may be stored on an external database server (not shown) in an encrypted form or on a storage system configured as external storage. Notably, a monotonically increasing sequence number is associated with each key object stored and managed by the LKM appliance, and when a peer LKM 300' is employed, each LKM will have a peer counter.

As known to those skilled in the art, descriptions of hardware and software made throughout this application may be implemented in many different forms. Those forms include hardware, software, firmware, and combinations thereof.

In operation, when a new encryption key is added by a security appliance as a result of, e.g., creation of a new cryptainer, the security appliance opens a secure channel to the LKM appliance and forwards the encryption key. The LKM appliance 300 illustratively stores the key in the key object database 395 and as a key object insertion entry, which enables recovery of the key should the key object database and/or file system become corrupted. In addition, a sequence number and a version number may be associated with the key stored and managed by the LKM appliance.

As described in detail later, key replication process 350 enables synchronization of encryption key objects to ensure that up-to-date keys are stored in the LKM appliances, 300, 300.' To initiate this synchronization, a first LKM appliance queries a second LKM appliance sending the highest sequence number known to the first LKM appliance that is associated with the second LKM appliance. In response, the second LKM appliance returns a key object within its key object database 395 that has an equal or higher sequence number. That key object is stored in the first LKM appliance with the higher sequence number. This process repeats between the LKM appliances in both directions until each is fully synchronized with the other LKM appliances—each having up-to-date valid keys.

Care is given as described below to ensure the synchronization converges. Deleting duplicate keys from the LKM appliances helps and the synchronization will stop (converge) when no new keys are generated. Also, care is given that the stored key objects are not corrupted, so the various storage processes described herein should be accomplished via atomic operations, as known to those skilled in the art. A sequence of operations performed atomically is one in which either all the contained operations fail, or all the contained operations succeed. There is no outcome in which some operations fail and some succeed.

The key replication process 350, as described herein, may be applied for sending newly created and/or modified keys from a security appliance 200 to the LKM appliance 300.

Still referencing FIG. 3, a local sequence counter (CTR) 311 and a peer counter 313 for each peer are arranged within a memory 310 of each LKM appliance. The sequence counter 311 allocates sequence numbers to objects, preferably in a monotonically increasing sequence, wherein no two objects share the same sequence number. The sequence and peer counters are preferably implemented in the memory 310, but may be implemented in other functional locations or as stand alones, as one skilled in the art would understand. In one preferred embodiment, the sequence counter is 64 bits long, but other lengths may be used to advantage in other applications. In addition, as described later, if an existing key object is modified, a version number, associated with the key, is incremented. If a new key is created and transferred to the LKM appliance, the next higher sequence number and a version number may be associated therewith.

The peer counter 313 also resides preferably in memory 310 and contains a count representing the highest sequence count from keys previously synchronized with its peer LKM appliance. The peer counter represents the state of synchronization, as described more fully below, between any two LKM appliances.

Note that each LKM appliance has is own sequence and peer counters that coexist with each other.

In more detail, the LKM appliance 300 of FIG. 3 comprises one or more processors, e.g., central processing units (CPU 302), the memory 310, one or more network adapters 320, SEP 391 and a storage controller 325 interconnected by a system bus 340, such as a conventional Peripheral Component Interconnect (PCI) bus. The SEP 391 is configured to perform all encryption and decryption operations for the LKM appliance in a secure manner; for example, the SEP 391 may be configured to protect plaintext encryption keys from software executing on each CPU 302. Accordingly, the SEP 391 is illustratively embodied as a FIPS certified module that is mounted onto a dedicated interface card or other similar card.

The network adapters 320 couple the LKM appliance 300 to one or more security appliances 200 over point-to-point links, wide area networks, virtual private networks implemented over a public network (Internet) or shared local area networks.

The memory 310 illustratively comprises storage locations that are addressable by the processors and adapters for storing software processes and data structures associated with the present invention. The processor and adapters may, in turn, comprise processing elements and/or logic circuitry configured to execute the processes and manipulate the data structures. In alternative embodiments, the processes may be implemented in software, hardware, firmware and/or a combination thereof. As such, the description of processes being implemented in software should be taken as exemplary only. It will be apparent to those skilled in the art that other processing and memory means, including various computer readable media, may be used for storing and executing program instructions pertaining to the invention described herein.

The processes include, e.g., a graphical user interface (GUI) process 330, a database (DB) process 335, a file system process 340, a storage device control process 345 and a key replication process 350. Illustratively, each of these processes may be implemented as part of an operating system (not shown) executing on the LKM appliance 300. However, in alternative embodiments, each of these processes may be independent of an operating system and may operate, e.g., as a user mode application on the LKM appliance 300.

The storage device control process 345 may be utilized in managing the storage controller 325 and storage space 400 provided by internal disks 160. Illustratively, the storage device control process 345 may also manage external storage, such as that provided by an external storage system 110.

The GUI process 330 provides a graphical user interface for administrators configure the key management functionality of the LKM 300. In alternative embodiments other forms of user interfaces, such as a command line interface (CLI), may be implemented. The database (DB) process 335 implements a database for use in storing and managing keys. Illustratively, the database process 335 implements a database provided on storage space 400 disposed on internal storage devices 160 manage by the storage controller 325. Storage space 400 may include a partition adapted to hold files implemented by file system process 340 in conjunction with storage device control process 345. In the example of processes executing as part of a conventional BSD (Berkeley Software Distribution) kernel, the file system process 340 may implement a conventional UFS (Unix File System) file system over all or a portion of storage space 400 managed by storage controller 325. Alternatively, the DB process 335 may interact with an external database server 130 to implement storage of keys on the server 130. In embodiments utilizing an external storage system 110 (FIG. 1), the DB process 335 may implement a database on storage space provided by the external storage system 110. Illustratively, the DB process 335 implements a conventional SQL (Structured Query Language) database; however in alternative embodiments, other data storage and/or retrieval mechanisms may be utilized.

When an LKM appliance is arranged within an environment of security appliances, a globally unique identifier may be used to uniquely identify each security appliance, each lifetime key management appliance (LKM), and each key object. The GUI will ensure that the LKM appliance is linked to each security appliances. The LKM appliance will request the globally unique IDs of all the members—all the members are configured with the globally unique ID of all the other members. As discussed in more detail below, when a key is created in a security appliance, that key is also assigned its own globally unique ID.

A person of ordinary skill in the art would understand that the LKM appliance can be implemented as a management console that manages operations of the storage system 110.

Figure 4A:
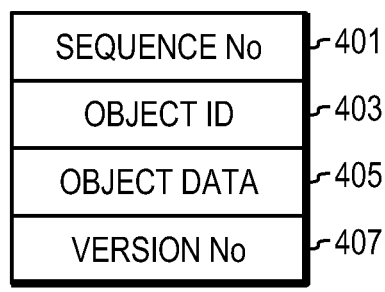
FIG. 4A is one possible data structure for an object.

The key replication process 350 illustratively implements functionality to distribute keys between pairs of LKM appliances 300 and 300' installed within a common network environment. Thus, for example, the key replication process 350 ensures that new keys, entered into one LKM appliance 300 within the environment, are distributed (i.e. synchronized) to the other LKM appliance within the environment. If there are more than two LKM appliances, the three pairs all synchronize independently. As discussed herein, atomic storage and detection of duplicates ensure that the process will converge. Such key replication is described further below with reference to FIGS. 4, 5 and 6. FIG. 4A is a block diagram of the content fields of an object that may be synchronized advantageously as described herein. Each object has a sequence number 401 that is, for example, a non-negative integer. The Object ID 403 is a non-negative integer that is a globally unique identifier of this particular object. Illustratively, the integer may be 128 bits long. The Object data 405 is a field representing the object itself, for example, if the object is a key, the Object Data 405 might be the key itself. Additionally, there may be a version number 407 that tracks modifications to the same key.

Figure 4B:
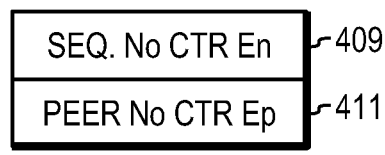
FIG. 4B is a table illustrating a sequence and a peer counter.

FIG. 4B is a chart illustrating the contents En of the sequence counter 409 and Ep of the peer counter 411. Illustratively, the contents represent the state of synchronization of the system, as discussed herein. These counter values are stored in memory 310 and shown in FIG. 3 as a local sequence counter 311 and a peer counter 313.

Figure 5:
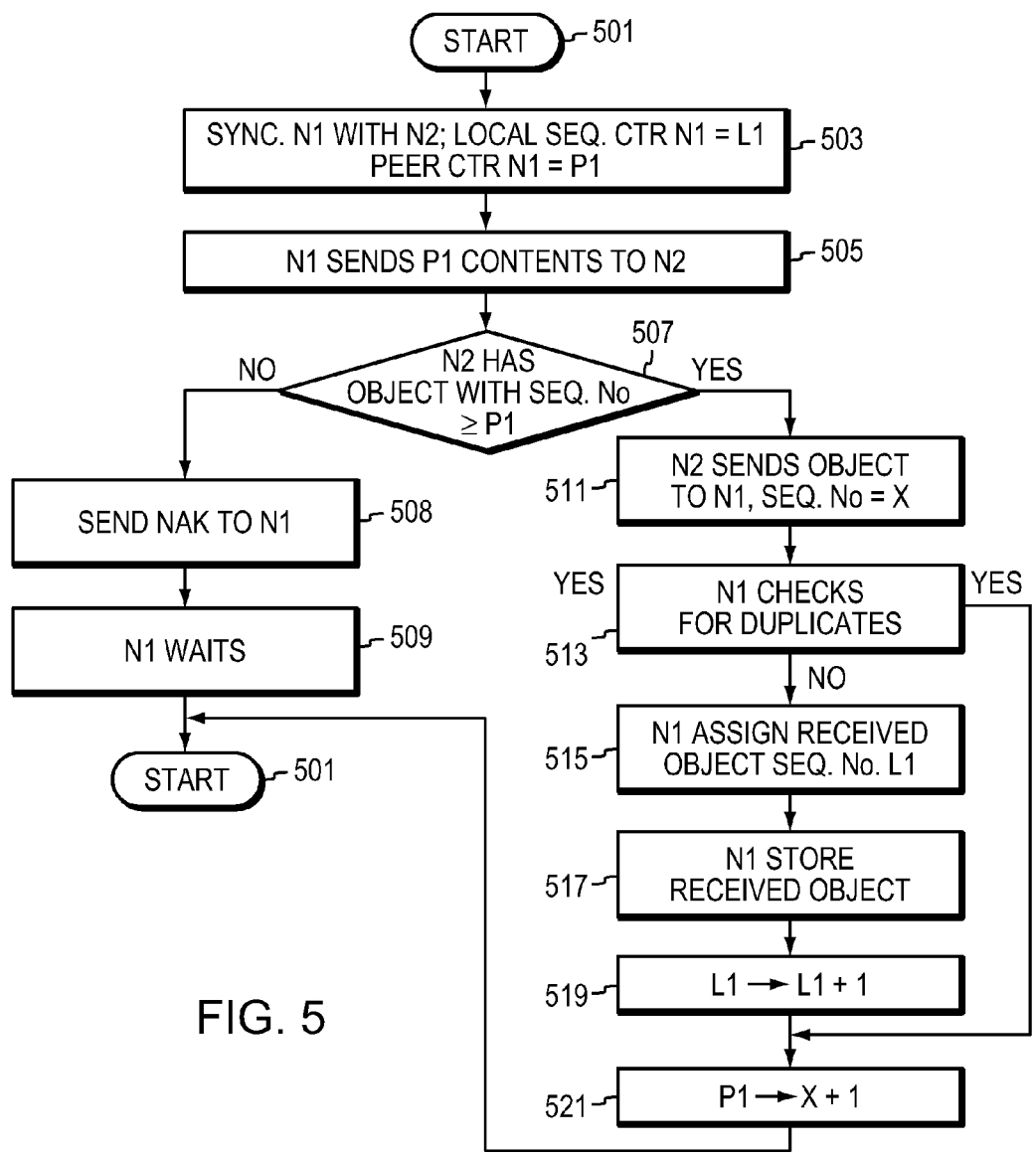
FIG. 5 is flow chart illustrating a process for synchronizing objects between two peers.

FIG. 5 is a flow chart illustrating a process for synchronizing between one LKM at node N1 and its peer via a communications link at node N2. The process starts at step 501 and proceeds to 503 where the local sequence counter of N1 is L1: and N1's peer counter is P1. Here, N1 is synchronized 503 with its peer N2 by receiving an object from N2 for insertion into N1's persistent memory. In step 505, N1 sends P1's contents to N2. In step 507 N2 determines if it has an object with a local sequence number (assigned in N2) of at least P1's contents. At this point the state of synchronization is that N1 (from a prior synchronization) received an object from N2 with a sequence number equal to the contents of P1-1. If N2 has no stored object with a sequence number of at least P1's contents, at step 508 N2 send a negative response (NAK) to N1. In step 509 N1 will wait some time and returns to step 501. If in step 507 N2 has an object with a local sequence number, e.g., X, that is at least equal to the contents of P1, N2 sends that object to N1 in step 511. N1 checks, in step 513, to see if that received object is a duplicate. If not a duplicate, N1 assigns the received object the local sequence counter number of L1 in step 515. In step 517, N1 stores the object, step 519 increments L1, and in step 521 sets P1 to X+1, the process returns to start 501. In steps 509 and 501, N1 waits and returns to start. Note, as mentioned above, the operations from steps 513 on should be performed atomically to preserve data integrity. If in step 513 N1 finds a duplicate, the process continues to step 521 where the P1 is replaced with X+1.

Note that the checking for duplicates in step 513 prevents an object from being passed between nodes continuously. Here, N1 will check the Object ID 403 which is a globally unique identifier across all nodes in the system, and the object transferred includes that Object ID 403. Two objects are considered duplicates if the Object ID's match.

When an object in a LKM is assigned a new sequence number, or a new version number or a new key is created in a security appliance, it may trigger synchronization. In other environments, synchronization may occur at some regular interval, and on occasion the entire system may be fully synchronized, by forcing the peer counters to zero.

The following describes modifying and deleting of objects. When an existing object is modified, its version number is incremented. If an LKM receives an object with the same Object ID, but a higher version number, then the LKM replaces the existing object with the new one. Deletion of an object by a modification that removes the object is handled as is any other modification. This action is not a true deletion as a record will exist, but the contents of the object data may be null or zeros or any such indication that the object is not used.

Figure 6:
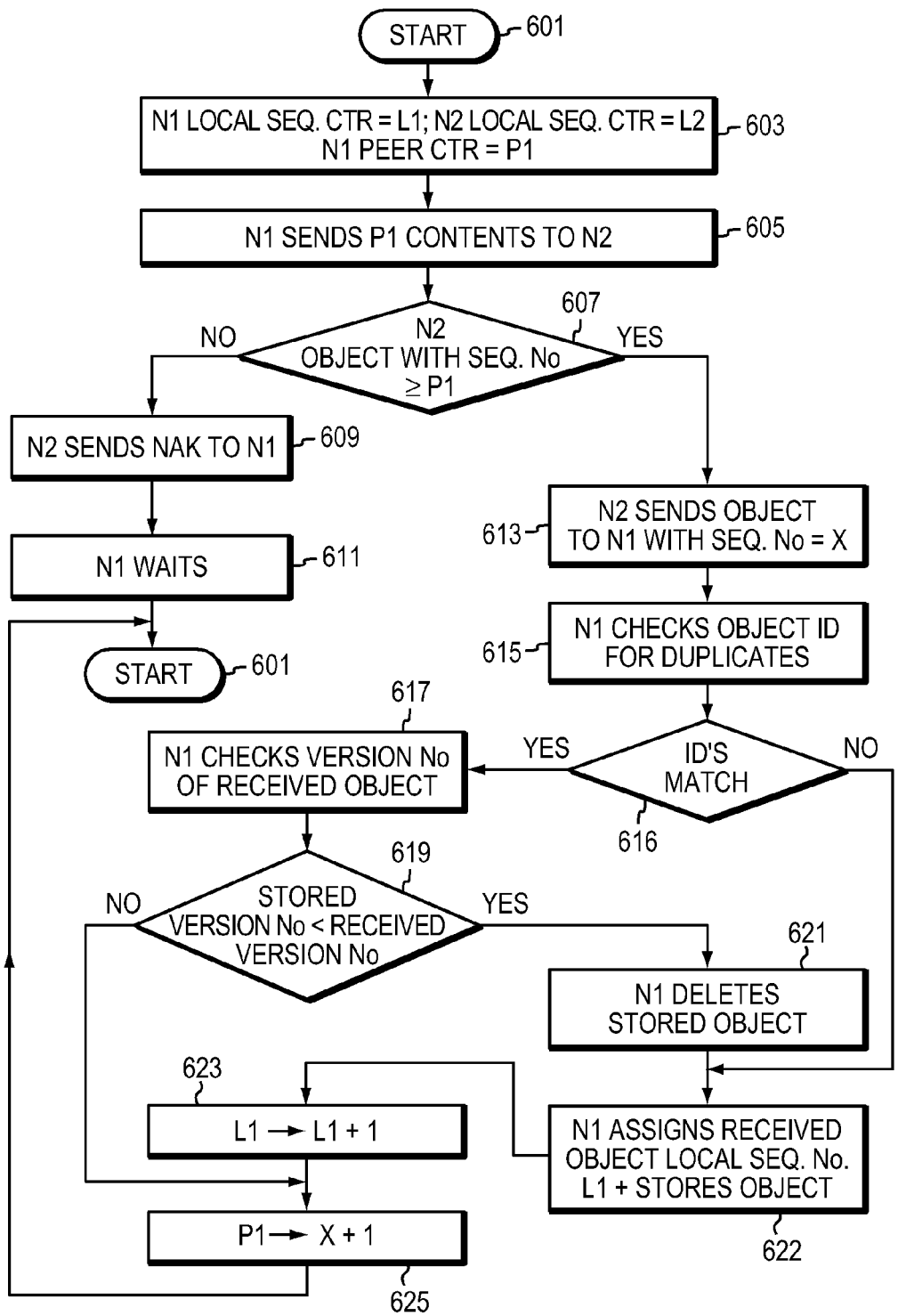
FIG. 6 is a flow chart illustrating a process for modifying and deleting objects.

FIG. 6 is a flow chart of a process for modifying and deleting objects. The process starts at step 601 and proceeds to step 603 where N1's local sequence counter is L1, N1's peer counter is P1, and N2's local sequence counter is L2. In response to a version change, N1 sends P1's contents to N2 in step 605. In step 607, N2 compares its data store to determine if it has an object with a sequence count of at least P1's contents. If there is none, N2 sends a negative response, NAK, in step 609 to N1. In step 611, N1 waits and in step 601 the process returns to start. In step 607, if there is such an object in N2, N2 sends the object to N1 in step 613, along with a local sequence number of, for example, X. In step 615, N1 compares the Object ID of the received object against the objects in its data store. If there is a match in step 616, the version numbers are checked in step 617. In step 619, if the stored version number is less than the version number of the received object, N1 deletes the stored object in step 621 and assigns the received object its local sequence number L1 and stores the object in step 622. In step 623, L1 is incremented and in step 625 P1 is loaded with X+1. In step 611, N1 waits and the process returns to step 601. If in step 619 the version number is not less that that of the received object, P1 is loaded with X+1 in step 625, and the process returns to the start 601. If there is no match of Object ID's in step 616, the received object is given the local sequence number L1 and N1 stores it in step 622. N1 then increments L1 in step 623 and then waits in step 611 to return to step 601.

It should be understood that above-described embodiments are being presented herein as examples and that many variations and alternatives thereof are possible. Accordingly, the present invention should be viewed broadly as being defined only as set forth in the hereinafter appended claims.

What is claimed is:

1. A system for synchronizing objects over a network, comprising:
    a processor;
    a memory coupled to the processor;
    a sequence counter and a local peer counter maintained in the memory, the sequence counter configured to provide a sequence number to each object that is created or modified at the system, wherein the sequence counter is incremented and a new sequence number is generated when a new object is created or an existing object is modified, wherein the local peer counter indicates a number of objects received from a peer during previous synchronizations and wherein the local peer counter is configured to be sent to the peer so that the system can be updated and synchronized with the peer;
    the processor configured to receive a peer counter from the peer, the received peer counter to indicate a number of the objects received by the peer during previous synchronizations, so that after completion of each previous synchronization the peer has all objects created or modified by the system up to a point in time associated with the previous synchronizations; and
    the processor further configured to compare the sequence counter to the received peer counter, determine that the system and peer are synchronized if the sequence counter and the received peer counter are the same, and send one or more particular objects having sequence numbers that are greater than the received peer counter and corresponding to the objects created or modified by the system after the previous synchronizations to synchronize the system with the peer if the sequence counter and the received peer counter are not the same.

2. The system of claim 1 wherein the system and the peer each have a unique global identifier to be distributed to each of the system and the peer.

3. The system of claim 1, wherein each object has a unique global identifier.

4. The system of claim 3 wherein the processor is further configured to execute a duplication identifier process to determine whether a first object received by the system from the peer is a duplicate of a previously received object.

5. The system of claim 4 wherein a version number is associated with each object wherein the version number is incremented whenever each object is modified, wherein if a duplicate object is found and a newly received object has a higher version number, the newly received object replaces a previously received object.

6. The system of claim 1 wherein each object is an encryption key object.

7. The system of claim 1 wherein the system is a lifetime key management appliance.

8. The system of claim 1 wherein the processor is a storage encryption processor.

9. A system for synchronizing encryption keys between a lifetime key management (LKM) appliance and a peer, comprising:
    a processor operatively connected to the LKM appliance and configured to execute a synchronizing process;
    the LKM appliance configured to be coupled to the peer using a communications link to receive the encryption keys transmitted from the peer;
    the LKM appliance further configured to maintain a local sequence counter to assign sequence numbers to one or more encryption keys created or modified on the LKM appliance, wherein the local sequence counter is incremented and a new sequence number is generated when a new encryption key is added or an existing encryption key is modified;

the LKM appliance further configured to maintain a peer counter to indicate a number of encryption keys received from the peer during previous synchronizations, so that after completion of each previous synchronization the LMK appliance has all encryption keys created or modified by the peer up to a point in time associated with the previous synchronization; and the LKM appliance further configured to synchronize with the peer by sending the peer counter to the peer, the LKM appliance further configured to receive only the encryption keys, from the peer, having peer sequence numbers that are greater than the peer counter sent from the LKM appliance to the peer and that correspond to encryption keys created or modified by the peer after the previous synchronizations.

10. The system of claim 9 wherein each encryption key is associated with a key object comprising the encryption key, a unique identifier of the encryption key, a version number of the encryption key, and the sequence number of the encryption key.

11. A method for synchronizing objects, comprising:

maintaining, by a node having a processor, a node sequence counter that provides a sequence number to each node object that is created or modified, where the node sequence counter is incremented and a new node sequence number is included when a new node object is created and when an existing node object is modified at the node;

maintaining, by the node, a first peer counter indicating a number of peer objects received by the node from a peer during previous synchronizations so that after completion of each previous synchronization the node has all the peer objects created or modified by the peer up to a point in time associated with the previous synchronization;

sending the first peer counter from the node to the peer; and receiving, at the node, one or more peer objects stored on the peer, wherein each of the one or more peer objects stored on the peer has a peer sequence number that is greater than the first peer counter received by the peer from the node to synchronize the node and the peer, and wherein each of the one or more peer objects corresponds to the objects created or modified by the peer after the previous synchronizations.

12. The method of claim 11 further comprising storing at the node the one or more peer objects sent to the node, wherein the one or more peer objects each including an encryption key, a unique identifier of the encryption key, a version number of the encryption key, and a sequence number.

13. The method of claim 11 further comprising associating a first unique global identifier to the node and the peer.

14. The method of claim 11 further comprising associating a unique global identifier to each object that is created or modified.

15. The method of claim 14 further comprising determining that the unique global identifier of a specific object is a duplicate of a previous object previously received from the peer.

16. The method of claim 14 further comprising:
associating a version number with each object; and
incrementing the version number when each object is modified.

17. The method of claim 16 further comprising:
in response to receiving a duplicate of a previously received object at the node and in response to the duplicate having a higher version number than the previously received object, replacing the previously received object with the duplicate.

18. The system of claim 9 wherein the LKM appliance is further configured to determine that a duplicate object received from the peer has a higher version number than a first object previously received from the peer, the LKM appliance to replace the first object with the duplicate object in response to determining the duplicate object has the higher version number than the first object.

19. The method of claim 11 further comprising:
sending a second peer counter from the peer to the node indicating a number of the node objects received by the peer from the node during the previous synchronizations so that after completion of each previous synchronization the peer has all node objects created or modified by the node up to the point in time associated with the previous synchronizations; and receiving, at the peer, one or more node objects stored on the node, wherein each of the one or more node objects stored on the node has a node sequence number that is greater than the second peer counter received by the node from the peer to synchronize the peer and the node, and wherein each of the one or more node objects corresponds to the node objects created or modified by the node after the previous synchronizations.

* * * * *

UNITED STATES PATENT AND TRADEMARK OFFICE
CERTIFICATE OF CORRECTION

PATENT NO. : 8,611,542 B1
APPLICATION NO. : 11/740490
DATED : December 17, 2013
INVENTOR(S) : Hiroshi Ishii et al.

Page 1 of 1

It is certified that error appears in the above-identified patent and that said Letters Patent is hereby corrected as shown below:

In the Specification:
Col. 9, line 6:
~~peer counters that coexist with each other.~~
peer counters that co-exist with each other.

In the Claims:
Claim 9, col. 13, line 10:
~~previous synchronization; and~~
previous synchronizations: and Claim 11, col. 13, lines 37-38:
~~point in time associated with the previous synchronization;~~
point in time associated with the previous synchronizations;

Signed and Sealed this
Twenty-fifth Day of February, 2014

Michelle K. Lee
*Deputy Director of the United States Patent and Trademark Office*